United States Patent
Kameyama et al.

(10) Patent No.: US 7,739,465 B2
(45) Date of Patent: Jun. 15, 2010

(54) BACKUP SYSTEM, METHOD, AND PROGRAM

(75) Inventors: Hiroaki Kameyama, Kawasaki (JP); Yosuke Senta, Kawasaki (JP); Yuichi Sato, Kawasaki (JP)

(73) Assignee: Fujitsu Limited, Kawasaki ( * ) Notice: Subject to any disclaimer, the term of this patent is extended or adjusted under 35 U.S.C. 154(b) by 1091 days.

(21) Appl. No.: 11/407,109

(22) Filed: Apr. 20, 2006

(65) Prior Publication Data

US 2007/0113032 A1    May 17, 2007

(30) Foreign Application Priority Data

Nov. 17, 2005  (JP) ............................ 2005-332790

(51) Int. Cl.
*G06F 12/16* (2006.01)
(52) U.S. Cl. ............................ 711/162; 711/161; 714/5; 714/6
(58) Field of Classification Search ................. 711/162, 711/161; 714/5, 6
See application file for complete search history.

(56) References Cited

U.S. PATENT DOCUMENTS

| | | | |
|---|---|---|---|
| 5,657,468 A * | 8/1997 | Stallmo et al. | 711/114 |
| 6,307,487 B1 | 10/2001 | Luby | |
| 6,320,520 B1 | 11/2001 | Luby | |
| 6,373,406 B2 | 4/2002 | Luby | |
| 6,411,223 B1 | 6/2002 | Haken et al. | |
| 7,263,588 B1 * | 8/2007 | Moritz | 711/161 |
| 2004/0064633 A1 | 4/2004 | Oota | |
| 2004/0117549 A1 | 6/2004 | Nakamura | |
| 2005/0195755 A1 | 9/2005 | Senta et al. | |
| 2005/0229023 A1 * | 10/2005 | Lubbers et al. | 714/4 |

FOREIGN PATENT DOCUMENTS

| | | |
|---|---|---|
| JP | 2000-076207 | 3/2000 |
| JP | 2003-296176 | 10/2003 |
| JP | 2004-126716 | 4/2004 |
| JP | 2004-192483 | 7/2004 |
| WO | 2004/030273 A1 | 4/2004 |

OTHER PUBLICATIONS

Terminal Disclaimer filed in corresponding U.S. Appl. No. 11/443,201.
Japanese Office Action mailed on Dec. 1, 2009 and issued in corresponding Japanese Patent Application 2005-332790.

* cited by examiner

*Primary Examiner*—Sanjiv Shah
*Assistant Examiner*—Jae U Yu

(57) ABSTRACT

A backup system is comprised of a main storage for storing original data and a plurality of local storages for distributing and storing the data. An encoding unit of the main storage server generates, after dividing the original data, a plurality of encoded data that is equal to or more than the dividing number by use of a code of which redundancy is variable. A distribution processing unit distributes the plurality of encoded data to the plurality of local storages, and causes the data to be stored therein. A restoring unit retrieves the encoded data corresponding to at least the division number of the original data from the local storages, and restores the original data. A redundancy control unit varies the redundancy in the encoding unit such that, the higher the importance of the data, the larger the redundancy. Furthermore, a distribution processing unit determines the distribution number such that the higher the reliability of the local storages, the more the number.

17 Claims, 17 Drawing Sheets

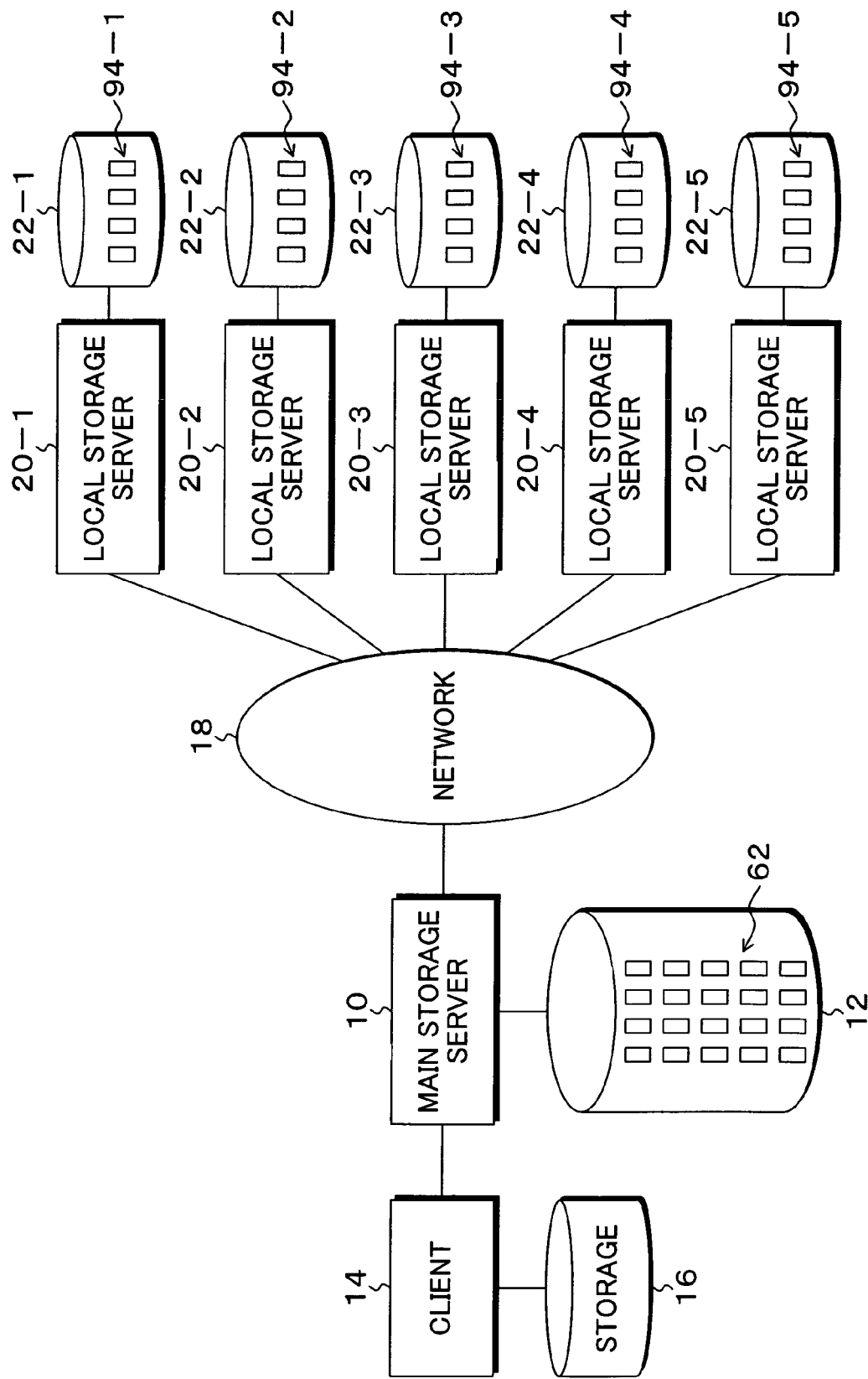

FIG. 11

| LOCAL STORAGE NO. | OPERATING RATE | RELIABILITY | NUMBER OF DISTRIBUTED DATA |
|---|---|---|---|
| 1 | A1 | R1 | D1 |
| 2 | A2 | R2 | D2 |
| 3 | A3 | R3 | D3 |
| 4 | A4 | R4 | D4 |
| 5 | A5 | R5 | D5 |

# BACKUP SYSTEM, METHOD, AND PROGRAM

This application is a priority based on prior application No. 2005-332790 filed Nov. 17, 2005, in Japan.

BACKGROUND OF THE INVENTION

1. Field of the Invention

The present invention relates to a backup system, method, and program for backing up data in preparation for a disaster or accident by distributing and allocating the data to a plurality of local storages, and, particularly relates to a backup system, method, and program for increasing tolerance against failure by redundantly encoding data which is to be distributed to local storages.

2. Description of the Related Arts

Conventionally, in order to protect data in a storage such as a magnetic disk device from failure, unexpected accidents, etc., RAID (Redundant Arrays of Independent Disks) is provided as a generally used technique. Although the levels of RAID include RAID 0 to RAID 6 in accordance with its use, typical ones used as techniques for enhancing safety of data are RAID 1, RAID 5, and RAID 6. RAID 1 is generally realized by use of two disks. This is the simplest method in which failure tolerance of the disks is enhanced by writing the same data to two disks, and called mirroring.

FIG. 1 is a distributed storage system to which RAID 1 is applied. In FIG. 1, to a main storage 100 connected via a network 102 are local storages 104-1 to 104-3 which function as distributed storages. In RAID 1, all the local storages 104-1 to 104-3 have data 106 that is same as the main storage 100, i.e., copy data 106-1 to 106-3 which is same as the data 106 of the main storage device 100; and when the data 106 of the main storage 100 is lost, data is transferred from any one of the local storages 104-1 to 104-3 so as to restore the lost data 106. RAID 5 is a method in which data is recorded in a manner that it is distributed to a plurality of disks, wherein, upon writing, a redundant code called parity obtained by addition of data is generated and written at the same time. Accordingly, even if any one of the disks fails, the original complete data can be restored from the data and parity information of the disks other than that.

FIG. 2 shows distributed storages to which RAID 5 is applied. The data of the main storage 100 is divided into data 108 and 110, and parity 112 is generated; and these are distributed to and stored in the local storages 104-1 to 104-3. In this case, for example, even if the data 110 is lost due to failure or the like of the local storage 104-2, the lost data 110 can be restored from the data 108 and the parity 112 of the local storage devices 104-1 and 104-3. RAID 6 is an extended version of RAID 5, wherein two pieces of parity are generated which is one in RAID 5. Accordingly, even if two disks fail at the same time, the original data can be restored in this method. Although there are several methods for obtaining the second parity, the Read Solomon code is generally employed.

FIG. 3 shows distributed storages to which RAID 6 is applied. The data of the main storage 100 is divided into data 108 and 110, and parity 112 and 114 is generated; and they are distributed to and stored in local storages 104-1 to 104-4. In this case, for example, even if data of two of the local storages 104-1 to 104-4 is lost due to failure or the like, the lost data can be restored from the data and/or parity of the two units of them which are normal. Moreover, as a conventional control method of a distributed storage system, when data is to be saved to a plurality of storages, it is made to be redundant in a doubled manner, thereby enabling restoration of data even when failure occurs in the storages In addition, as a data storage method utilizing a wide-area distributed storage system, security of data is improved by distributing and storing data to and in a plurality of storages, and, at the same time, optimum setting of the storages is selected in consideration of physical distances between the storages, thereby improving line efficiency and safety of the data in a disaster.

However, when back up is performed by the mirroring method of RAID 1 with respect to such conventional plurality of local storages which are geographically distributed, the copy of the original data is generated in each local; therefore, there is a problem that, although failure tolerance is high, the utilization efficiency of the storages is extremely bad. Moreover, although the utilization efficiency of the storages is high in RAID 5 compared with RAID 1, a restorable case is merely when one local storage fails, and restoration is impossible when two or more units thereof fail at the same time. Furthermore, RAID 6 has problems that the utilization efficiency is lower than RAID 5 by an amount corresponding to one disk since two pieces of parity are generated, and the calculation amount is large since the Read Solomon code is used for obtaining the second parity. On the other hand, the method of Patent Document 1 is a method in which double redundancy is performed when data is to be saved to a plurality of storages, thereby enabling restoration of the data even if failure occurs in the storage and speeding up read-out; however, when two or more storages fail at the same time, the data cannot be recovered. The method of Patent Document 2 is a method in which security of data is improved by distributing and storing the data to and in a plurality of storages; however, it has a problem that the utilization efficiency of the storages is bad since the data amount stored in each storage is the same.

SUMMARY OF THE INVENTION

According to the present invention to provide a backup system, method, and program having high restoration ability against failure when data is backed up by distributing and allocating the data to a plurality of local storages.

(System)

The present invention provides a backup system. The backup system of the present invention is characterized by having a main storage device for storing original data;

a plurality of local storage devices for storing the distributed data of the storage device;

an encoding unit for, after dividing the original data, generating a plurality of encoded data equal to or more than the division number by use of a code of which redundancy is variable;

a redundancy control unit for varying the redundancy in the encoding unit;

a distribution processing unit for distributing the plurality of encoded data to the plurality of local storage devices and causing the encoded data to be stored in the local storage devices; and a restoring unit for retrieving the encoded data corresponding to at least the division number of the original data from the local storage devices and restoring the original data.

Herein, the encoding unit has a block dividing unit for dividing the original data into n-units of block data, and an encoded data generating unit for generating, merely in a number m according to redundancy Q, headers, in each of which a bitmap specifying one or a plurality of blocks for obtaining exclusive OR in the n-units of block data is disposed, and encoded data comprised of exclusive OR data of the one or plurality of block data specified by the header; wherein the restoring unit retrieves the block number n or more of the encoded data from the plurality of local storage devices, and converts the header part into a unit matrix by means of the Gaussian elimination method so as to restore the n-units of block data.

The redundancy control unit varies the redundancy in the encoding unit in accordance with importance of the original data. In the redundancy control unit, the importance of the original data is manually set or automatically set based on a keyword contained in the original data, update date and time, or update frequency. For example, as the automatic setting of the importance, the redundancy control unit sets importance corresponding to the keyword contained in the original data, and then, corrects the importance in accordance with the update date and time and/or the update frequency.

The distribution processing unit sets the distribution number of the plurality of encoded data in accordance with reliability or usable capacity of the plurality of local storage devices. In the distribution processing unit, the importance of the local storage device is manually set or automatically set based on an operating rate or response time (RTT). For example, the distribution processing unit sets the importance of the local storage device in accordance with the operating rate, and then, corrects the importance in accordance with the response time (RTT) of the local storage.

When the local storage device is newly added or eliminated, based on the local storage devices after the change, the encoded data is regenerated in the encoding unit, and then, the encoded data is redistributed by the distribution processing unit.

The main storage device stores the original data in synchronization with data of a storage device of a client, and the plurality of local storage devices is connected to the main storage device through a network.

(Method)

The present invention provides a backup method. More specifically, the present invention is a backup method of a system having a main storage device for storing original data and a plurality of local storage devices for storing the distributed data of the main storage device; characterized by having an encoding step of, after dividing the original data, generating a plurality of encoded data equal to or more than the division number by use of a code of which redundancy is variable;

a redundancy control step of varying the redundancy in the encoding step;

a distribution processing step of distributing the plurality of encoded data to the plurality of local storage devices and causing the encoded data to be stored in the local storage devices; and a restoring step of retrieving the encoded data corresponding to at least the division number of the original data from the local storage devices and restoring the original data.

(Program)

The present invention provides a backup program. The backup program of the present invention is characterized by causing a computer of a main storage device for distributing and storing original data to and in a plurality of local storage devices to execute an encoding step of, after dividing the original data, generating a plurality of encoded data equal to or more than the division number by use of a code of which redundancy is variable;

a redundancy control step of varying the redundancy in the encoding step;

a distribution processing step of distributing the plurality of encoded data to the plurality of local storage devices and causing the encoded data to be stored in the local storage devices; and a restoring step of retrieving the encoded data corresponding to at least the division number of the original data from the local storage devices and restoring the original data.

It should be noted that details of the backup method and program according to the present invention are basically same as the backup system according to the present invention.

In the present invention, in order to enable data restoration even when one or more local storages fail at the same time, encoded data in which redundant data with respect to the data is added by an encoding method in which the redundancy (encoding rate) is variable is generated, and distributed to and stored in a plurality of local storages. Even when failure or a disaster occurs in the plurality of local storages, as long as the encoded data can be retrieved from the rest of the local storages in the number required for restoration, the original data can be restored, and reliability of backup using distributed storages can be improved. Moreover, in the present invention, when the data is to be encoded, the redundancy rate of important data is increased, and the redundancy rate of data that is not really important is lowered. Consequently, compared with a case in which the redundancy rate is fixed, the encoded data can be efficiently distributed and allocated to the local storages, and back up of the original data can be performed without increasing the number of encoded data beyond necessity. Moreover, in the present invention, the number of encoded data to be distributed to the plurality of local storages is determined in accordance with the reliability of respective local storages. The higher the reliability, the more the encoded data is distributed; and, when the reliability is low, the number of distributed data is reduced. Consequently, lost of the encoded data due to failure of the local storages can be suppressed to a minimum level, the number of encoded data required for restoration of the original data can be stably retrieved, and the redundancy rate of the data can be suppressed while ensuring high reliability. Moreover, when the encoded data is to be distributed to the plurality of local storages, the number of distributed data is dynamically determined in accordance with, for example, failure frequency (operating rate) or the usable capacity of each local storage; thus, the reliability upon failure can be further improved. Furthermore, since the number of the encoded data (data amount) to be distributed to the local storage is variable, high-performance local storages and low-performance local storages, or local storages having large backup usable capacities and local storages having small capacities thereof can be used together, the utilization efficiency of the local storages can be increased, and building the backup system is facilitated and the cost thereof can be reduced at the same time. The above and other objects, features, and advantages of the present invention will become more apparent from the following detailed description with reference to the drawings.

BRIEF DESCRIPTION OF THE DRAWINGS

FIG. 9 is an explanatory diagram of a distribution process in which distribution is uniformly performed with respect to local storages;

FIG. 11 is an explanatory diagram of the distribution control table of FIG. 4;

DETAILED DESCRIPTION OF THE PREFERRED EMBODIMENTS

Figure 1:
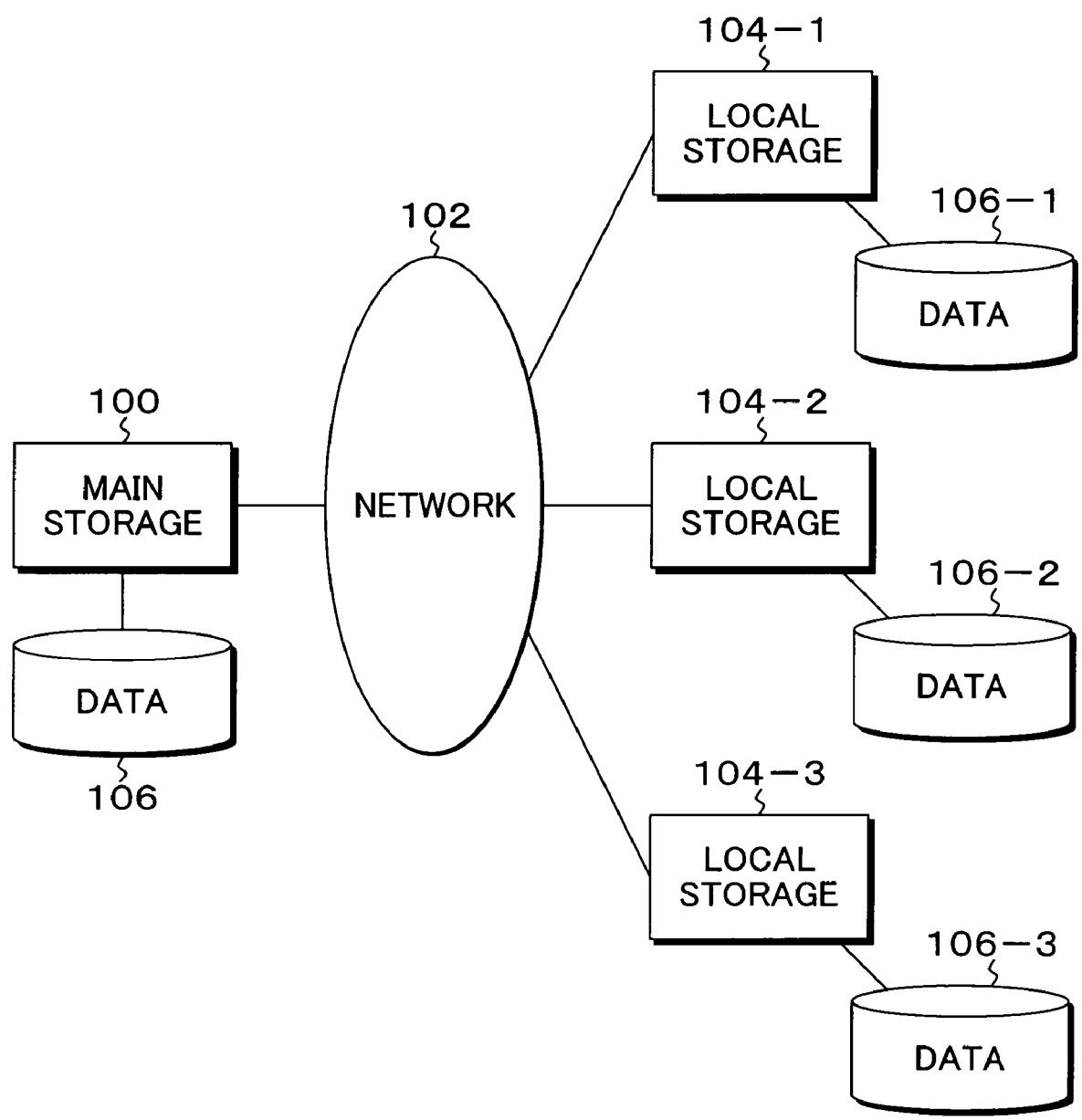
FIG. 1 is an explanatory diagram of conventional distributed storages using RAID 1.
Figure 2:
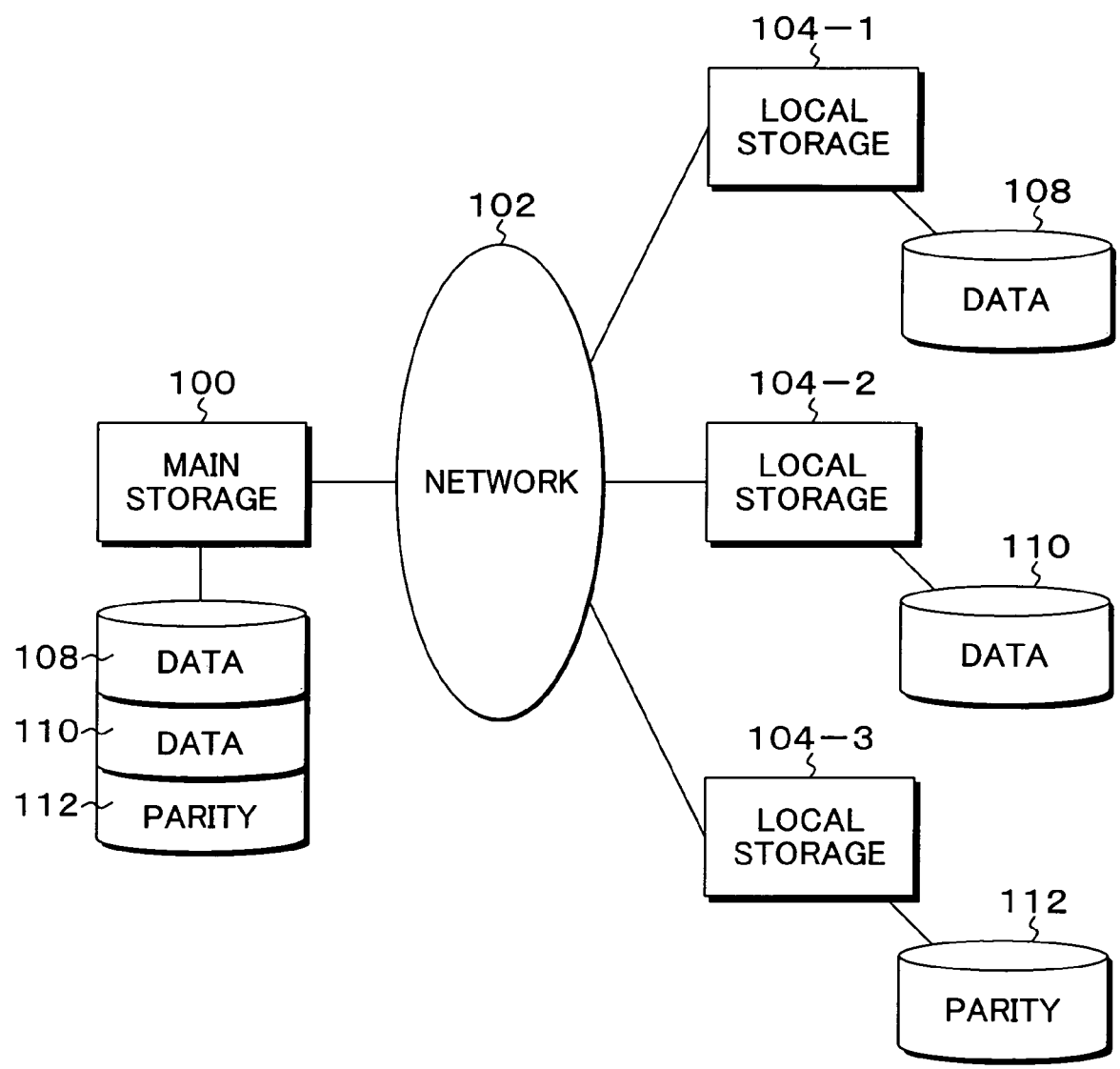
FIG. 2 is an explanatory diagram of conventional distributed storages using RAID 5.
Figure 3:
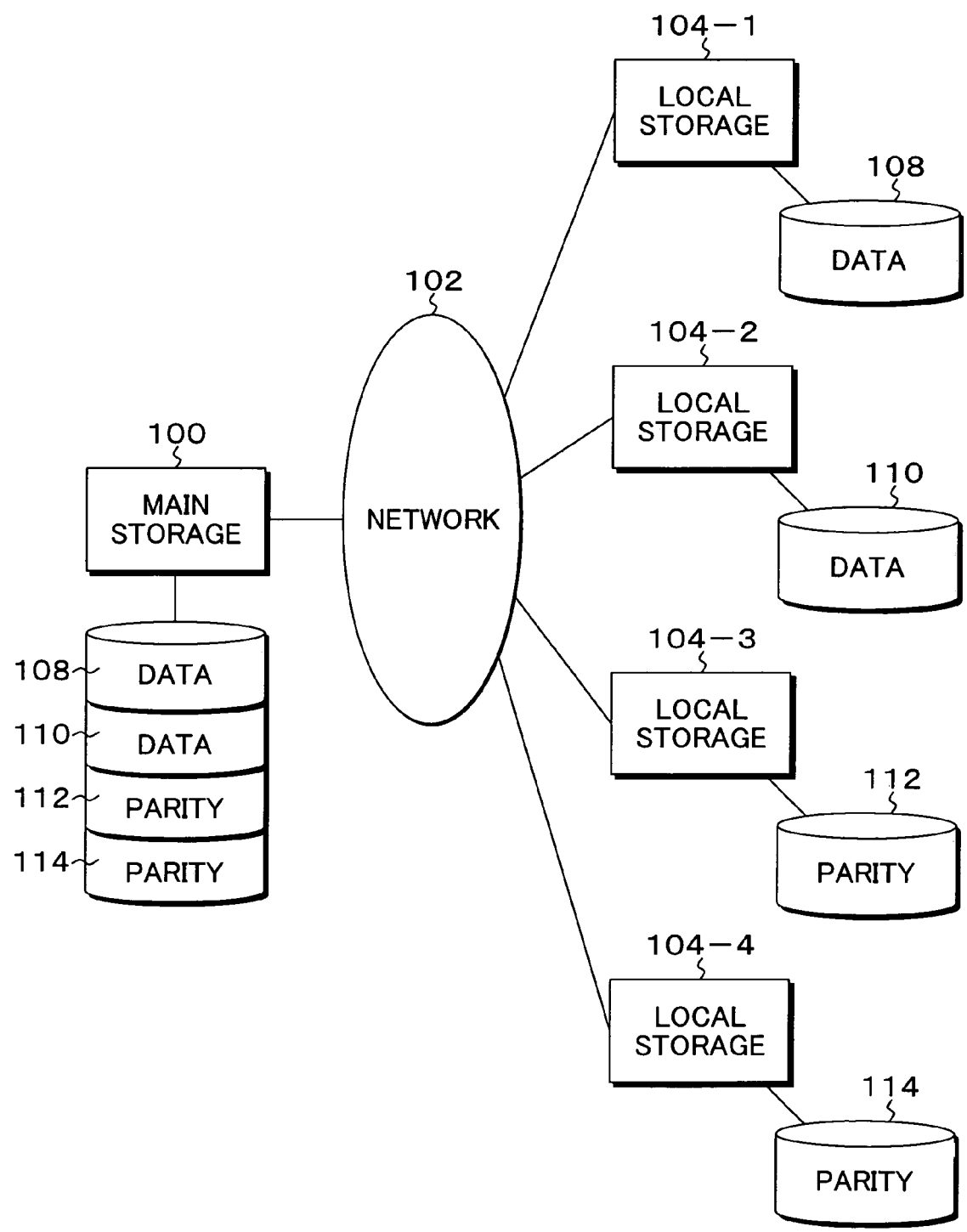
FIG. 3 is an explanatory diagram of conventional distributed storages using RAID 6.
Figure 4:
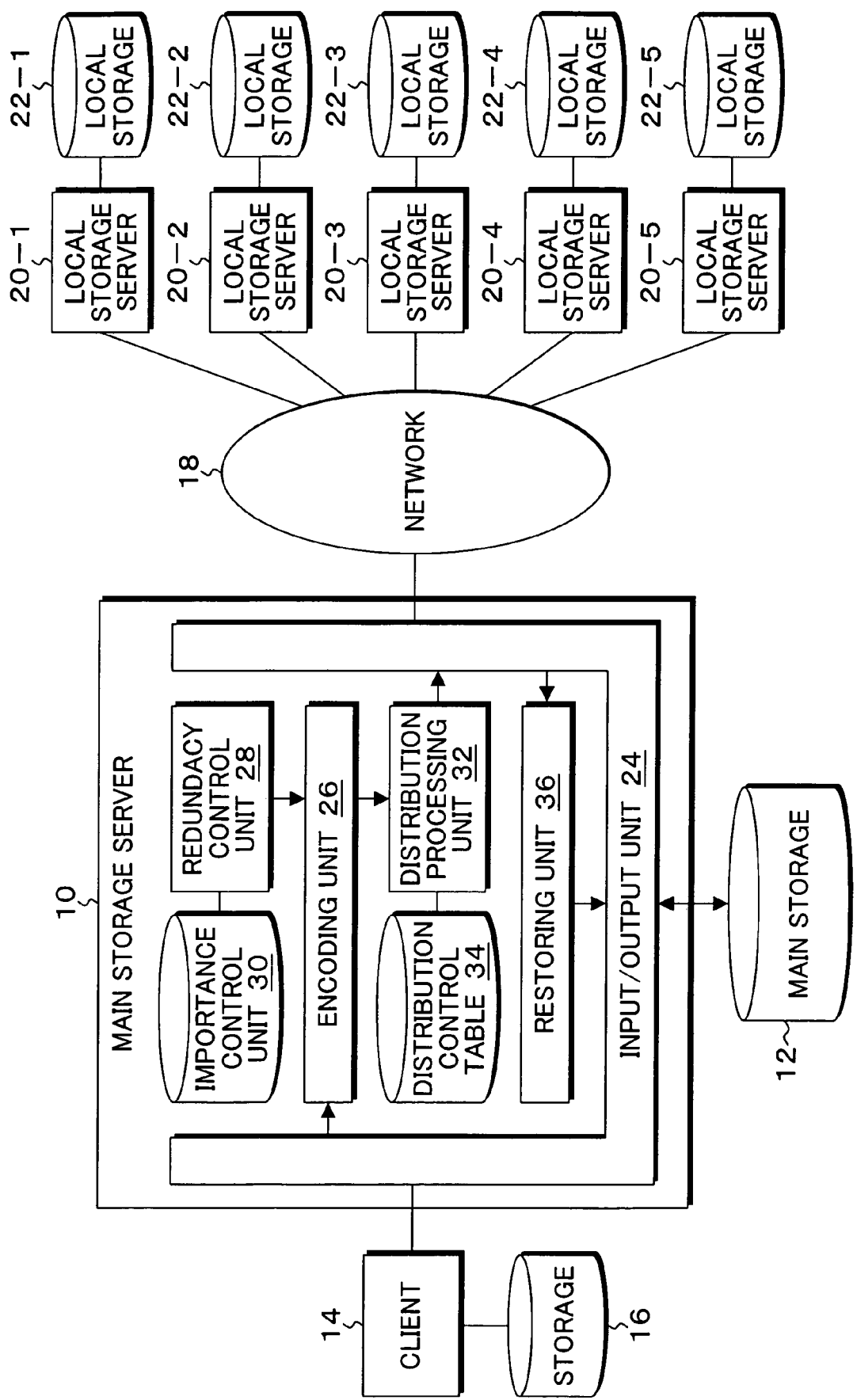
FIG. 4 is a block diagram of a system function configuration showing an embodiment of the present invention.

FIG. 4 is a block diagram of a system function configuration showing an embodiment of a backup system according to the present invention. In FIG. 4, the backup system of the present embodiment is built for backing up data of a client 14, a main storage server 10 is connected to the client 14, and in a main storage 12 of the main storage server 10 stored is data stored in the storage 16 generated by a user at the client 14, for example, a file is synchronously stored in the main storage 12. To the main storage server 10 connected are local storage servers 20-1 to 20-5 via a network 18, the local storage servers 20-1 to 20-5 have local storages 22-1 to 22-5, respectively, and the local storages 22-1 to 22-5 function as distributed storages with respect to the main storage 10. When a file generated and updated at the client 14 is stored in the main storage 12 of the main storage server 10, the file of the user stored in the main storage 12 is employed as original data and converted into encoded data by use of a code of which redundancy is variable, and then, it is distributed to and stored in the local storages 22-1 to 22-5. When restoration of the file is required in the main storage server 10, access is made to the local storage servers 20-1 to 20-5 via the network 18, and the distributed and allocated encoded data is retrieved so as to restore the original file. In the main storage server 10, an input/output unit 24, an encoding unit 26, a redundancy control unit 28, an importance control table 30, a distribution processing unit 32, a distribution control table 34, and a restoring unit 36 are provided. Among these, fundamental functions of the main storage server 10 are comprised of the encoding unit 26, the distribution processing unit 32, and the restoring unit 36. The encoding unit 26 divides the file which is stored in the main storage 12 and serves as the original data of the user into block data of a predetermined block number n, then, each block data is converted into a code of which redundancy is variable, for example, in the present invention, a Random Parity Stream code (RPS code) which is elucidated in the following description and comprised of a header and XOR data, and plural units of encoded data equal to or more than the number of divided blocks are generated. The distribution processing unit 32 distributes the plurality units of encoded data generated in the encoding unit 26 to the local storages 22-1 to 22-5 such that they are stored therein. The restoring unit 36 retrieves the encoded data corresponding to at least the number of divided blocks of the file serving as the original data from the local storages 22-1 to 22-5, and restores the original file. Herein, the redundancy control unit 28 varies the redundancy of encoding processes in the encoding unit 26. The redundancy can be represented by Redundancy $Q=m/n$ wherein the block division number of the original data is n, the number of the units of the encoded data generated by the Random Parity Stream code is m. The redundancy Q is the reciprocal of an encoding rate R. Thus, the encoding rate R can be represented by Encoding rate $R=n/m=1/Q$.

Herein, the redundancy Q is a value of one or more, while the encoding rate R is a value between 1 and 0. Therefore, in the encoding unit 26, based on the redundancy Q set by the redundancy control unit 28, m-units of encoded data according to the redundancy Q are generated from n-units of the block data of the file which is divided as the original data. Furthermore, the redundancy control unit 28 varies the redundancy Q in the encoding unit 26 in accordance with the importance of the file serving as the original data. More specifically, the higher the importance of the file, the more the redundancy Q is increased; and the lower the importance of the file the more the redundancy is reduced. In determination of the importance of the file, for example, a keyword contained in the file can be used. Moreover, in addition to the keyword, the update date and time or update frequency of the file can be used for the importance. Moreover, in the distribution processing unit 32, the distribution number of the encoded data with respect to the local storages 22-1 to 22-5 can be determined in accordance with the reliability of the local storages 22-1 to 22-5. More specifically, distribution is performed such that the higher the reliability of the local storage, the more the distribution number of the encoded data is increased; and the lower the reliability, the more the distribution number of the encoded data is reduced. The reliability of the local storages 22-1 to 22-5 can be manually set or automatically set based on the operating rate or the response time (RTT). For example, in automatic setting of the reliability of the local storage, first, the reliability is determined from the operating rate, and then, a process of correcting the value thereof is performed in accordance with the response time (RTT). Furthermore, the distribution number of the encoded data can be determined in accordance with the reliability and the usable capacity of the local storage. When the Random Parity Stream code is used as the code of which redundancy is variable, the restoring unit 36 retrieves at least the divided block number n or more of the encoded data from the local storages 22-1 to 22-5, and converts the headers into a unit matrix by means of the Gaussian elimination method, thereby restoring the n units of block data.

Figure 5:
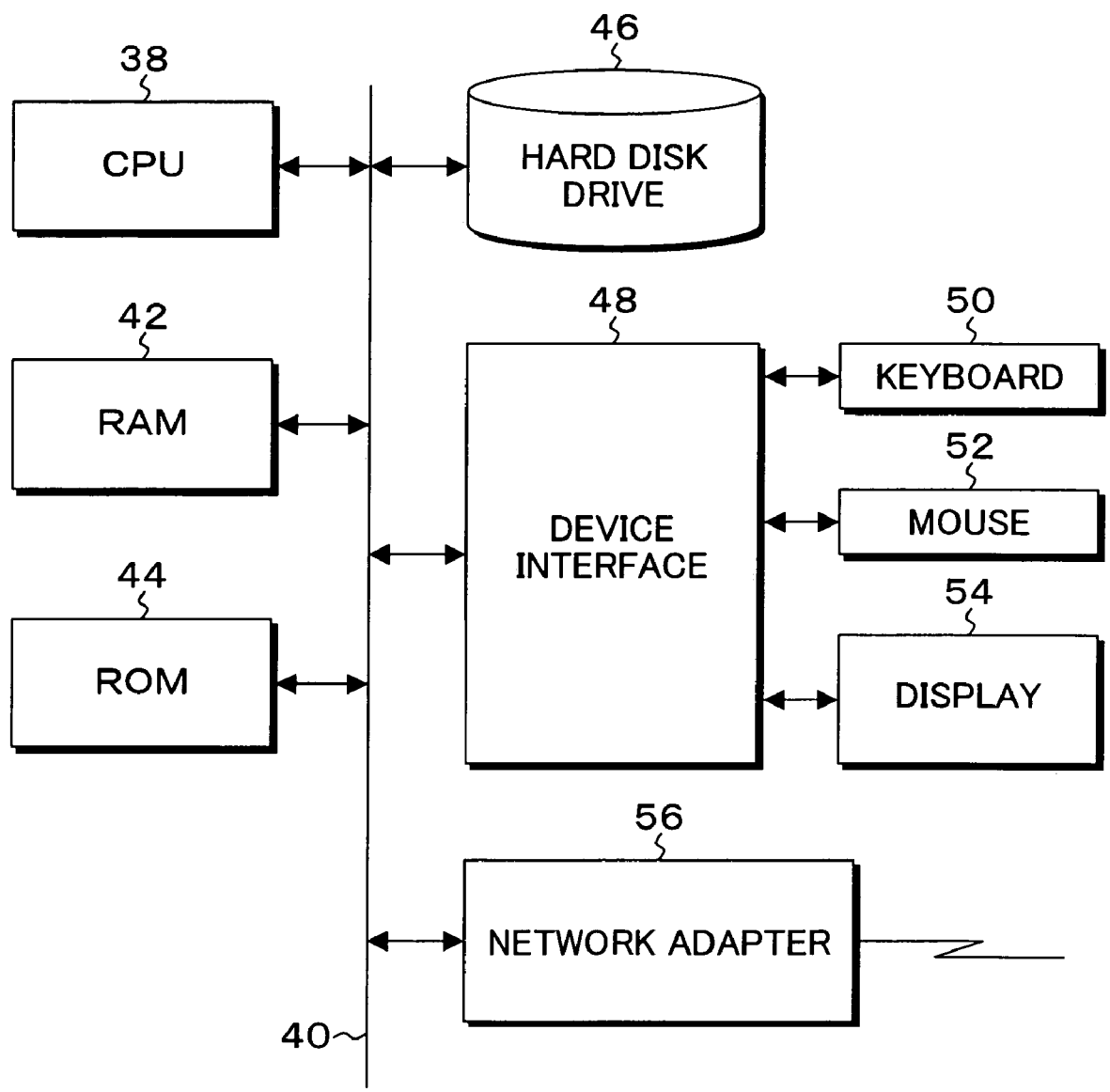
FIG. 5 is a block diagram of a hardware environment of a computer to which the servers of FIG. 4 can be applied.

FIG. 5 is a block-diagram of a hardware environment of a computer to which the main storage server 10, the local storage servers 20-1 to 20-5, and the client 14 of FIG. 4 can be applied. In FIG. 5, with respect to a bus 40 of a CPU 38, a RAM 42; a ROM 44; a hard disk drive 46; a device interface 48 connecting a keyboard 50, a mouse 52, and a display 54; and a network adapter 56 are provided. In the main storage server 10 of FIG. 4, a processing program for building the backup system of the present embodiment is stored in the hard disk drive 46, and the processing program is read to the RAM 42 when the computer is started up and executed by the CPU 38.

Figure 6:
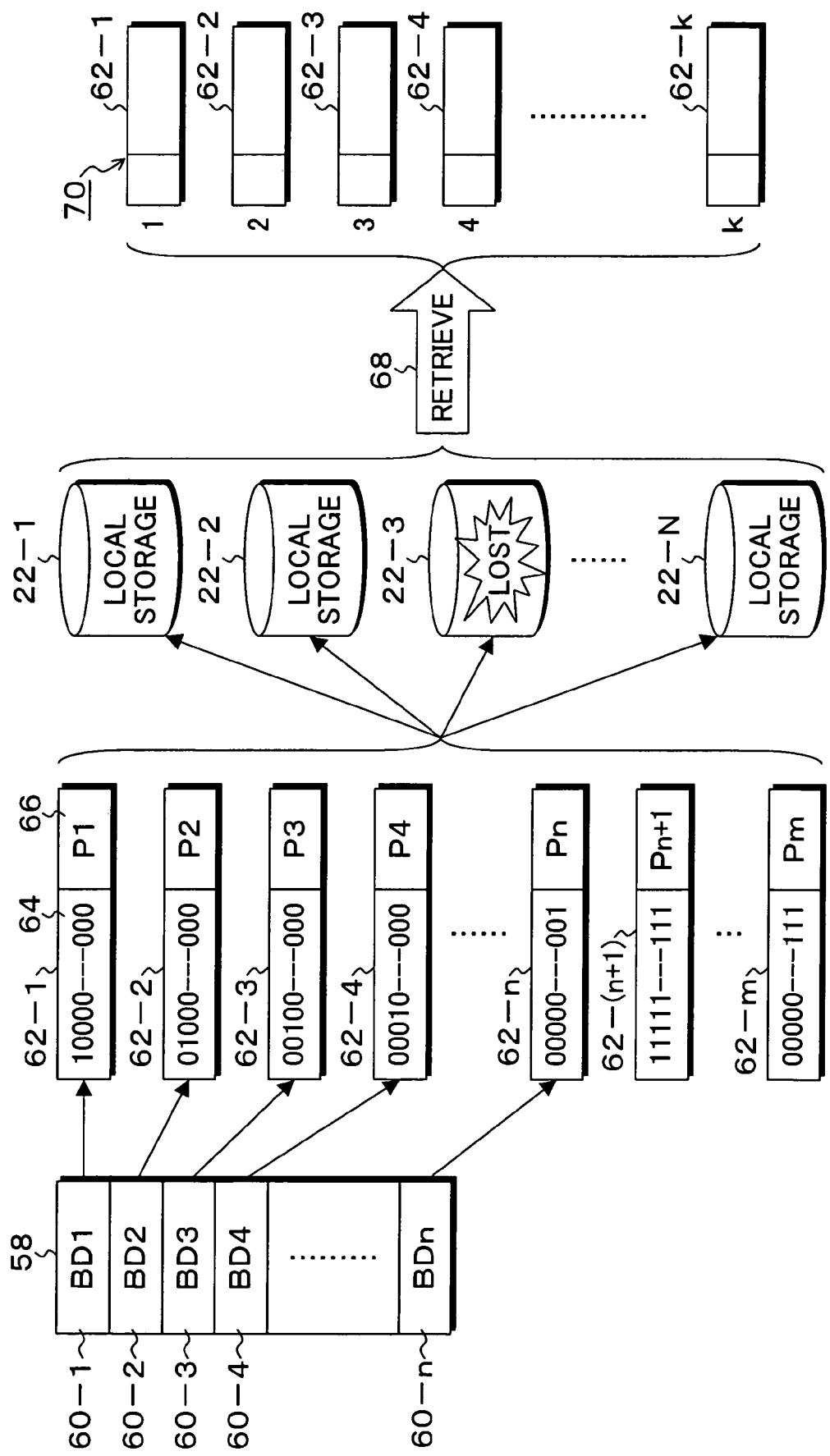
FIG. 6 is an explanatory diagram of an encoding process, a distribution process, and a retrieval process for restoration according to the present invention.
Figure 7:
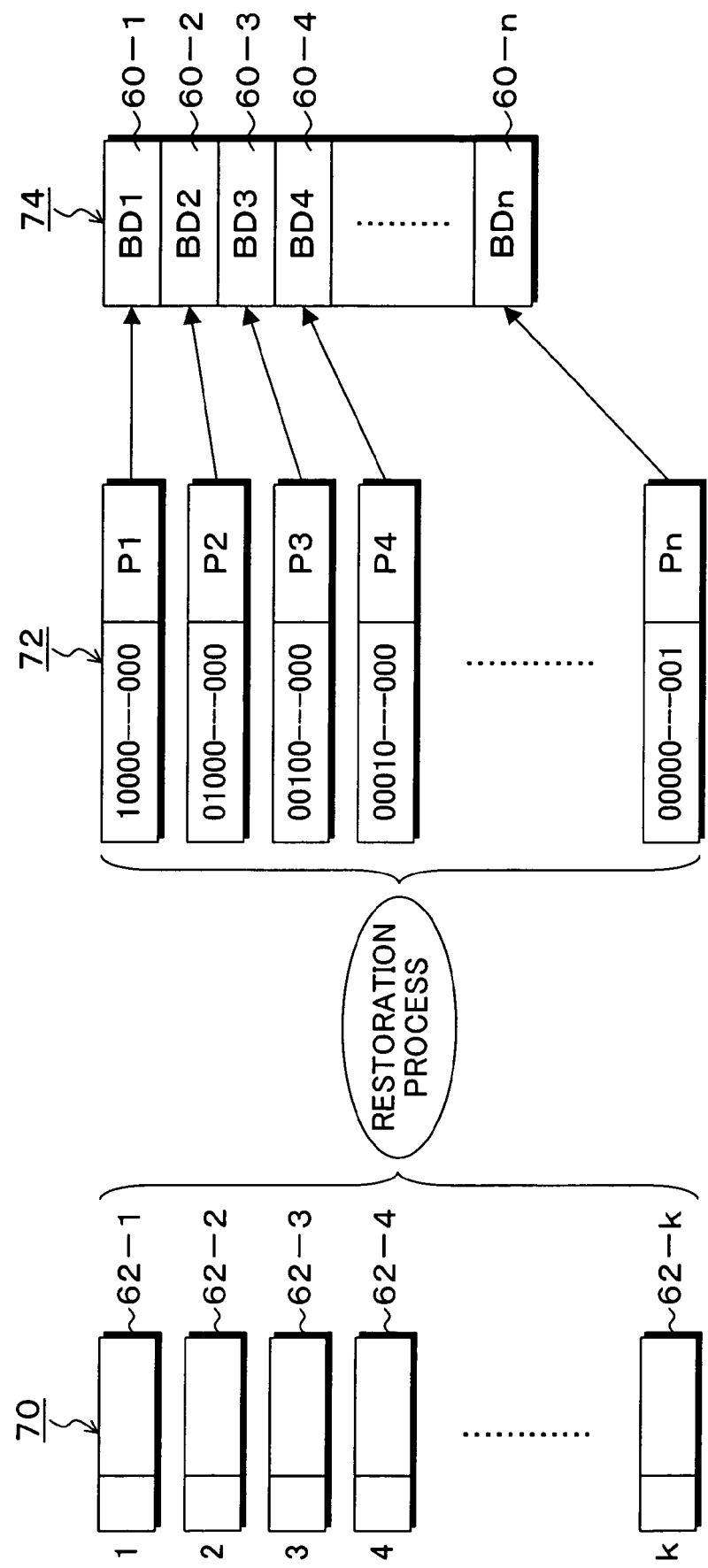
FIG. 7 is an explanatory diagram of a restoration process subsequent to the retrieval process of FIG. 6.

FIG. 6 is an explanatory diagram of an encoding process, a distribution process, and a retrieval process for restoration according to the present invention, and FIG. 7 further shows a restoration process subsequent to the retrieval process of FIG. 6. In the present invention, the Random Parity Stream code (RPS code) is used as the code of which redundancy Q is variable in the encoding unit 26 of FIG. 4. The Random Parity Stream code has a calculation amount which is smaller than that of the Read Solomon code used in RAID 6, and can dynamically change the redundancy Q; therefore, the backup system for distributing and allocating data to a plurality of local storages can be flexibly built. In encoding of the Random Parity Stream code used in the present invention, as shown in FIG. 6, the file serving as original data 58 is divided into the predetermined block number n, thereby generating block data 60-1 to 60-n. In an actual system, for example, the divided block number n=1028 and block size=1280 bytes are fixedly set, and a user file serving as the original data 58 is divided wherein the file capacity determined by the divided block number n and the block size serves as a maximum capacity. When the user file is smaller than the maximum size of the original data, dummy data is put into the open part, thereby generating a constant divided block number n of block data. The block data 60-1 to 60-n which has been divided from the original data 58 into the divided block number n is comprised of headers 64 and XOR data 66, and converted into encoded data 62-1 to 62-m of m-units determined by the redundancy Q. When the encoded data 62-1 is taken as an example, the header 64 is n-bit bitmap data showing the position of the block data 60-1 to 60-n divided in the original data 58 and used for calculating the XOR data 66. For example, the header 64 of the encoded data 62-1 is "10000 . . . 000", wherein merely one bit at the left end is "1", and all the rest is "0". In the XOR data 66, one or plural corresponding units of block data is selected from the original data 58 in accordance with the bitmap of the header 64 to calculate exclusive OR (XOR), and data P1 is calculated and stored as the XOR data 66. In the present embodiment, in the encoded data 62-1 to 62-n corresponding to the n-units of block data 60-1 to 60-n, the bit showing the position of the corresponding block data is "1", and all the rest is "0" in each header 64; as a result, merely one block data is used in the XOR calculation by virtue of the header 64. Therefore, P1, P2, P3, P4, . . . Pn in the XOR data 66 is the data same as the block data BD1, BD2, BD3, BD4, . . . BDn, that is, the block data per se. Meanwhile, in the rest, encoded data 62-(n+1) to 62-m exceeding the divided block number n, bit "1" is set in the header 64 thereof for specifying two or more blocks for XOR calculation, and the bitmap in the header 64 is, for example, randomly generated. Moreover, as the bitmaps of the headers 64 in the encoded data 62-(n+1) to 62-m, numerical values which can be readily converted into a unit matrix in the restoration process which is elucidated in the following description are desired to be used, and such numerical values are, for example,

1111 . . . 111
0101 . . . 101
1010 . . . 010
0000 . . . 111
1111 . . . 000.

The m-units of encoded data 62-1 to 62-m generated in the encoding process are distributed to and disposed in the local storages 22-1 to 22-N uniformly or in accordance with the reliability, and stored therein. In restoration based on the encoded data distributed to and disposed in the local storages 22-1 to 22-N, retrieval 68 of the encoded data is performed so as to obtain encoded data 62-1 to 62-k as retrieved data 70, and, as shown in FIG. 7, the original block data 60-1 to 60-m can be restored as restored data 74 from the k-units of encoded data.

In the restoration process in FIG. 7, a process of conversion into a unit matrix 72 by means of the Gaussian elimination method with respect to the headers 64 in the k-units of encoded data 62-1 to 62-k obtained as the retrieved data 70 is performed, thereby restoring the block data 60-1 to 60-n as the original block data BD1 to BDn from the values P1 to Pn corresponding to the XOR data 66 added to them. In this restoration process, even when the encoded data is lost due to failure in, for example, the local storage 22-3 among the local storages 22-1 to 22-N as shown in FIG. 6, when the inverse matrix of the headers can be obtained in the restoration side through the conversion into a unit matrix 72 as shown in FIG. 7, the original block data 60-1 to 60-n can be restored. More specifically, in distributed allocation of data using the Random Parity Stream code of the present invention and in the restoration process which is started when part of data is lost, the m-units of encoded data is generated in accordance with the redundancy Q so as to be excessive about several percent the division n of the block data 60-1 to 60-n of the original data 58, and these are distributed and allocated; consequently, when the number of the encoded data required for restoring the original data is k, as long as k-units of the encoded data can be collected in total from the rest, i.e., the normal local storages, the original data can be restored, even when two or more of the local storages fail. Therefore, in the present invention, a dynamic redundancy (encoding rate) determination process is performed in accordance with the importance of the data distributed and allocated to the local storages and stored therein. The number k of the encoded data with which the original data can be restored by use of the Random Parity Stream code is changed in accordance with the number m of the generated encoded data; therefore, safety of the data upon occurrence of failure is also changed. The more the number m of the encoded data, the more the redundancy Q is increased; wherein although the total capacity of the local storages required for the distributed allocation is increased, the original data can be restored more reliably. In other words, tolerance against failure can be adjusted by the number m of the encoded data. The redundancy Q of encoding in the Random Parity Stream code can be changed for each file which is to be backed up; therefore the redundancy Q is controlled to be changed in accordance with the importance of the file serving as the original data. More specifically, the redundancy Q can be increased for an important file so as to increase the tolerance against failure, and the redundancy Q can be reduced for a file which is not important that much so as to lower the tolerance against failure, thereby reducing the required capacity of the local storages. Specifically, respectively for the files serving as the original data, V1 to Vn is determined in advance as the levels of importance, and, in accordance with predetermined importance Vi, the number m of generated encoded data is determined by the following expression.

$$m = F(V_i) \quad (1)$$

[Expression 1]

The importance Vi for obtaining the number m of the encoded data according to this expression (1) can be determined by manual setting performed by the user or automatic setting. In the automatic setting of the importance, for example, keywords are registered to correspond to files for determining the importance of the files, and, upon encoding of the file, the keyword that the file has and the keywords registered in advance are compared with each other. When a corresponding keyword is contained in the file, the importance which has been set in advance is set in accordance with the keyword. In this case, when the automatically determined importance is largely different from the importance automatically set by the user, the automatically set importance may be displayed to the user such that the user can select either one. Furthermore, as a parameter for determining the importance of the file, the last update date, access frequency, etc. of the file can be also used. Regarding the update date and the access frequency of the file, the importance may be independently set and prepared, for example, in accordance with table information, or, for example, the importance determined based on the keyword may be corrected based on the last update date, access frequency, etc. The number m of the encoded data which is set in accordance with the importance of the original data means to change the redundancy Q (=m/n), and the range of the redundancy Q which is changed in accordance with the importance is, as a practical range, for example, about 1.1 to 1.5 since, when the redundancy is increased to much, the data amount to be distributed to the local storages is increased and the utilization efficiency is lowered.

Figure 8A:
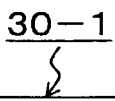
FIGS. 8A to 8C are explanatory diagrams of the importance control table of FIG. 4.
Figure 8B:
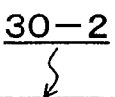
Figure 8C:
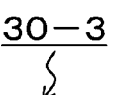

FIGS. 8A to 8C are explanatory diagrams of the importance control table 30 of FIG. 4 which controls the importance of the file used in calculation of the encoded data number n. An importance control table 30-1 of FIG. 8A is comprised of keywords 76 and importance 78, and any of the keywords W1 to W5 representing importance is stored in each file. Therefore, when the file is to be encoded, any of the keywords corresponding to the file is extracted, and the importance control table 30-1 is referenced so as to set the corresponding importance.

An importance control table 30-2 of FIG. 5B is comprised of last update dates 80 and the importance 78 of files; and, for example, current day, less than 3 days, less than 1 week, less than 1 month, less than 3 months, etc. are set as the last update dates 80, and the importance V1 to V5 is accordingly set. The more recent the last update date, the higher value the importance 78 has in the last update date 80.

An importance control table 30-3 of FIG. 5C is comprised of update frequency 82 and the importance 78; wherein the range of predetermined update frequency is set separately in five levels as the update frequency 82, and, the higher the update frequency, the higher the value set as the importance 78.

Regarding the importance control table 30-1, 30-2, and 30-3 shown in FIGS. 8A, 8B, and 8C, the importance may be set by independently using them. Alternatively, for example, a method in which, after the importance 78 is determined in accordance with the keyword 76 of the file by use of the importance control table 30-1 of FIG. 8A, the value of the importance 78 set in accordance with the keyword 76 is corrected to be increased if the last update date is recent or is corrected to be reduced if the last update date is old, and, in accordance with the update frequency of the file, the importance is corrected to be increased if the update frequency is high or is corrected to be reduced if the update frequency is low may be employed.

The distribution process of the encoded data in the distribution processing unit 32 of FIG. 4 in accordance with the reliability of the local storages will next be described. In conventional RAID and mirroring, local storages having the same capacity are required for forming distributed storages. Furthermore, in order to reliably save data, all the local storages are desired to have equivalent performance. On the other hand, in the present embodiment, merely retrieving k-units or more of the encoded data from the local storages is required for restoring the original data, and the number of units of the encoded data that each local storage has does not matter. Therefore, in the distribution process of the encoded data of the present embodiment, when the encoded data is to be distributed to the local storages, more encoded data is distributed to and saved in highly-reliable local storages, and less encoded data is distributed and saved in less-reliable local storages. Consequently, a backup system in which local storages having the same performance are not required to be prepared, and local storages serve as distributed storages with lower cost can be built.

FIG. 9 is an explanatory diagram of a result of distribution of encoded data 62 performed by the main storage server 10 when reliability of the local storages 22-1 to 22-5 is the same; and, in this case, for example, 20 units of the encoded data 62 encoded in the main storage server 10 are uniformly allocated to the five local storages 22-1 to 22-5, such that five units of distributed encoded data 94-1 to 94-5 are stored in each of them.

Figure 10:
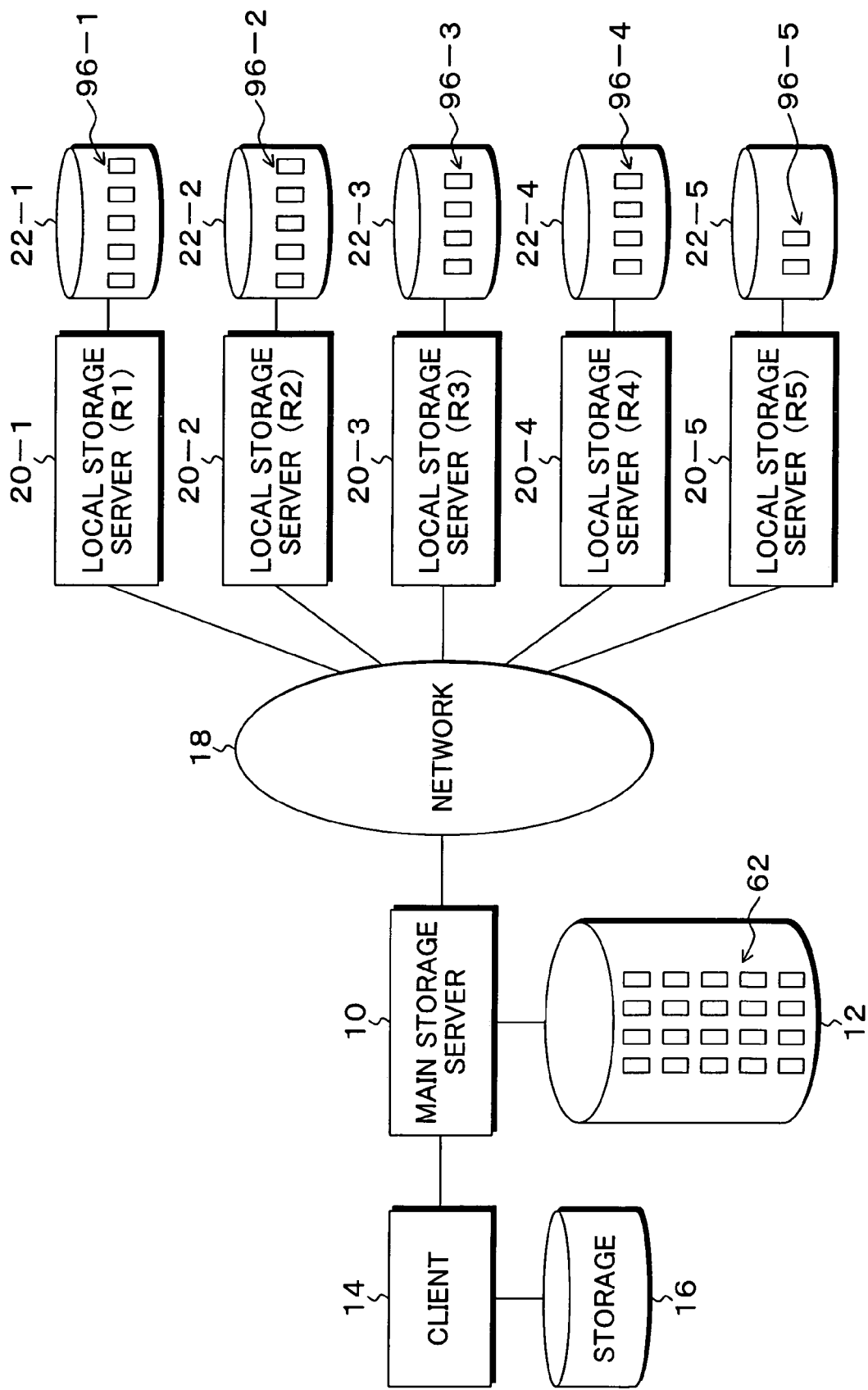
FIG. 10 is an explanatory diagram of a distribution process in which distribution is performed with respect to local storages in accordance with reliability.

FIG. 10 is a case in which reliability of the local storages 22-1 to 22-5 is different; and, in this case, for example, reliability R1 and R2 of the local storages 22-1 and 22-2 is the same and the highest, reliability R3 and R4 of the local storages 22-3 and 22-4 is the same and the second highest, and reliability R5 of the local storage 22-5 is the lowest. In such a case, regarding the 20 units of the encoded data 62 encoded in the main storage server 10, five units of distributed encoded data 96-1 or 96-2 are stored in the local storage 22-1 or 22-2 having the highest reliability R1 or R2, four units of distributed encoded data 96-3 or 96-4 are stored in the local storage 22-3 or 22-4 having the second highest reliability R3 or R4, and two units of distributed data 96-5 is stored in the local storage 22-5 having the lowest reliability R5. As the reliability for thus determining the distribution number of the encoded data to be stored in the local storages, the value of the operating rate which is generally used as an index of the reliability of a storage is used. An operating rate Ai is obtained from mean failure time MTBF (Mean Time Between Failure) and mean repair time MTTR (Mean Time To Repare) in accordance with the following expression.

[Expression 2]

$$Ai = \frac{MTBF}{(MTBF + MTTR)} \qquad (2)$$

Herein, the mean failure time MTBF is an index representing that in how many hours one failure occurs in average, and can be obtained by the following expression.

[Expression 3]

$$MTBF = \frac{\text{Total Operating Time}}{\text{Total Number Of Failure}} \qquad (3)$$

The mean repair time MTTR represents the time taken for repair when failure occurs, and can be obtained by the following expression.

[Expression 4]

$$MTTR = \frac{\text{Total Operating Time}}{\text{Total Number Of Failure}} \quad (3)$$

Therefore, reliability Ri of a local storage is a value obtained by the following expression by use of the operating rate Ai of the above described expression (2).

[Expression 5]

$$Ri = \frac{1}{1 - Ai} \quad (5)$$

Furthermore, when the number of units of the encoded data generated through encoding is m, and the reliability of each of n-units of the local storages is Ri, the number Di of the encoded data distributed to the local storage can be determined by the following expression.

[Expression 6]

$$Di = \frac{Ri}{\sum_{k=1}^{N} R_k} * m \quad (7)$$

Herein, the number m of the units of generated encoded data in the expression (6) can be represented by use of the importance Vi of the file serving as the original data according to the expression (1); therefore, the number Di of the encoded data finally distributed to each local storage can be represented by the below expression by use of the importance Vi of the file and the reliability Ri of the local storage.

[Expression 7]

$$Di = \frac{Ri}{\sum_{k=1}^{N} R_k} * F(V_i) \quad (7)$$

In the above description, the operating rate Ai of the local storage is used for determining the reliability Ri of the local storage; however, RTT (Round Trip Time) which is a physical distance between the main storage 12 and the local storages 22-1 to 22-5, a capacity Ci which can be used for back up of the local storage, etc. can be used for determining the number m of the encoded data to be distributed. For example, when the physical distance RTT of the local storage with respect to the main storage 12 is used, the reliability Ri of the local storage calculated by the above described expression (5) can be corrected by the below expression.

[Expression 8]

$$Di = \frac{RTT_i}{\sum_{k=1}^{N} RTT_i} \times R_i \quad (8)$$

When the usable capacity Ci of the local storage is used, the above described expression (6) is replaced by the below expression.

[Expression 9]

$$Di = \frac{R_i + V_i}{\sum_{k=1}^{N} (R_i + V_i)} \cdot m \quad (9)$$

Furthermore, in the present invention, when the number N of the units of the local storages connected to the main storage server 10 via the network 18 is changed, the encoded data distribution number Di with respect to the local storage after change is recalculated in accordance with the above described expression (6), and the encoded data corresponding to merely the difference is redistributed.

FIG. 11 is an explanatory diagram of the distribution control table 34 used by the distribution processing unit 32 of FIG. 4 for distributing the encoded data to the local storages. The distribution control table 34 of FIG. 11 is formed of local storage numbers 84, operating rates 90, reliability 86, and the number of distributed data 88; wherein the reliability 86 is obtained by the expression (5) from the operating rate 90 calculated by the expression (2), and the number of distributed data 88 finally calculated by the expression (6) is stored. Furthermore, in accordance with needs, correction of the reliability using the physical distance RRT to the local storage, or the number of distributed data obtained in a calculation according to the expression (9) using the usable capacity Ci of the local storage is stored in the table; and the encoded data may be distributed to the local storages based on that.

Figure 12:
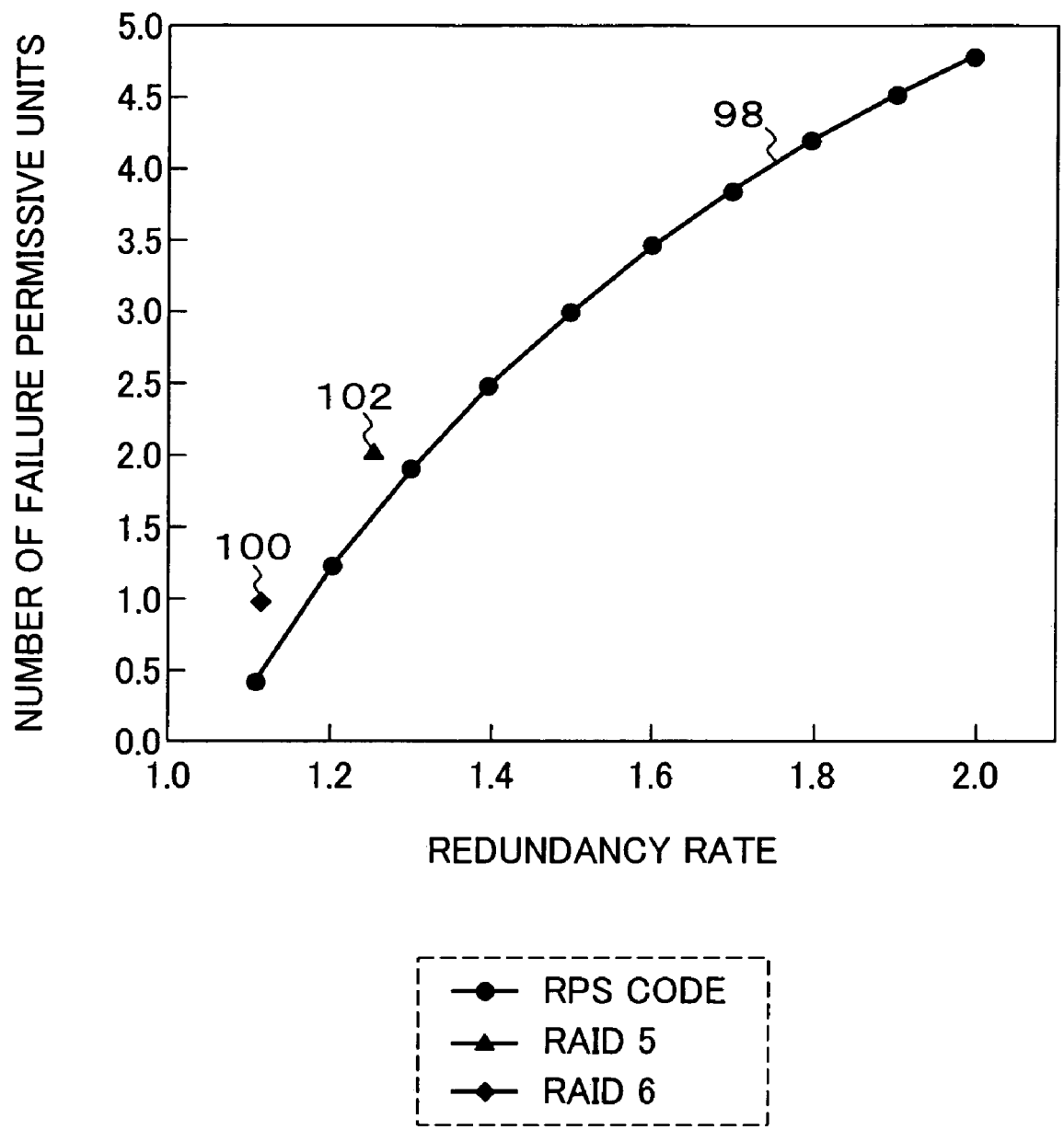
FIG. 12 is a property chart of redundancy rate and the number of failure-permissible units in encoded data according to the present invention and RAID.

FIG. 12 shows, in comparison with conventional RAID, the relation between the redundancy of the Random Parity Stream code used in the present embodiment and the number of failure permissive units. In FIG. 12, the horizontal axis is the redundancy rate of the data, and the vertical axis is the number of restorable failed units of the local storages. In this case, the total number N of the local storages is 10. Herein, in conventional RAID 5, the number of units of failure-permissive local storage is one as shown at a property point 100, and the redundancy rate of the data is fixed at 1.111. Also in RAID 6, the number of units of failure-permissive local storage is two as shown at a property point 102, and the redundancy rate of data is fixed at 1.25. On the other hand, when the Random Parity Stream code in the present embodiment is employed, by changing the redundancy rate, the number of failure-permissive units can be changed from one to four as shown by a property curve 98, so as to flexibly manage failure of local storages.

Figure 13:
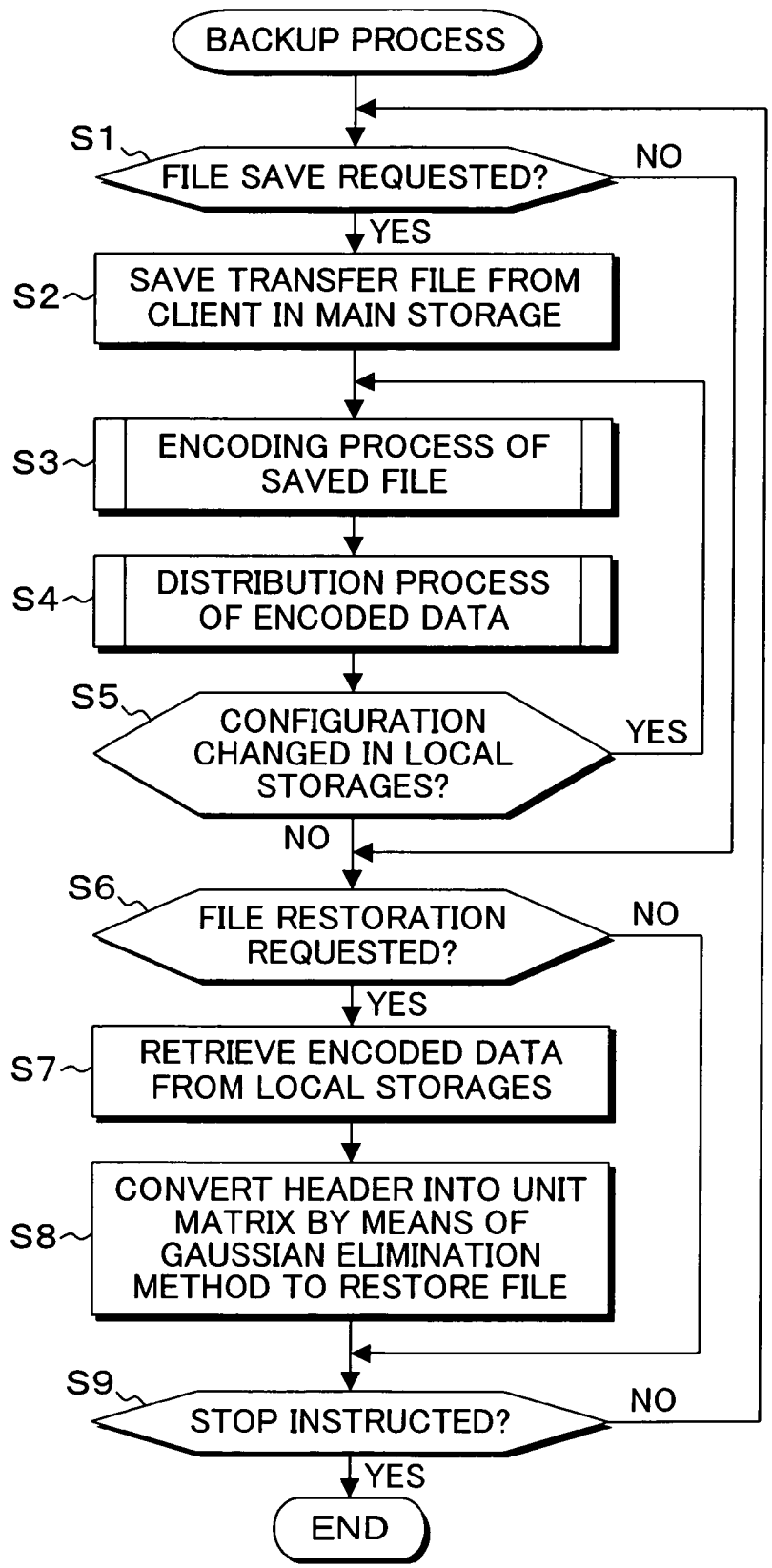
FIG. 13 is a flow chart of a backup process according to the present invention.

FIG. 13 is a flow chart of a backup process of the present invention performed by the main storage server 10 of FIG. 4. In FIG. 13, presence of a file save request from the client 14 is checked in step S1, and when the file save request is received, a transfer file from the client 14 is saved in the main storage 12 in step S2. Subsequently, after the encoding process of the saved file is executed in step S3, the distribution process in which the encoded data is distributed to the local storages 22-1 to 22-5 is performed in step S4. Subsequently, whether there is a configuration change in the local storages, that is, change in the number of units thereof is checked in step S5, and if there is the change, the process returns to step S4 wherein the distribution number of the encoded data is recalculated, and the encoded data corresponding to the difference is redistributed. If there is no change in the configuration of the local storages, presence of a file restoration request is checked in step S6; and if there is the file restoration request, the encoded data distributed and saved in the local storages 22-1 to 22-5 is retrieved therefrom in step S7; and the restoring unit 36 converts the headers into a unit matrix by means of the Gaussian elimination method so as to restore the file of the original data in step S8. Such processes of steps S1 to S8 are repeated until there is a stop instruction in step S9. The file restoration is requested in step S6, for example, when the file backed up in the main storage 12 of the main storage server 10 is lost due to failure or the like, and the need of restoring the original data which is backed up in the main storage 12 through failure restoration is generated.

Figure 14:
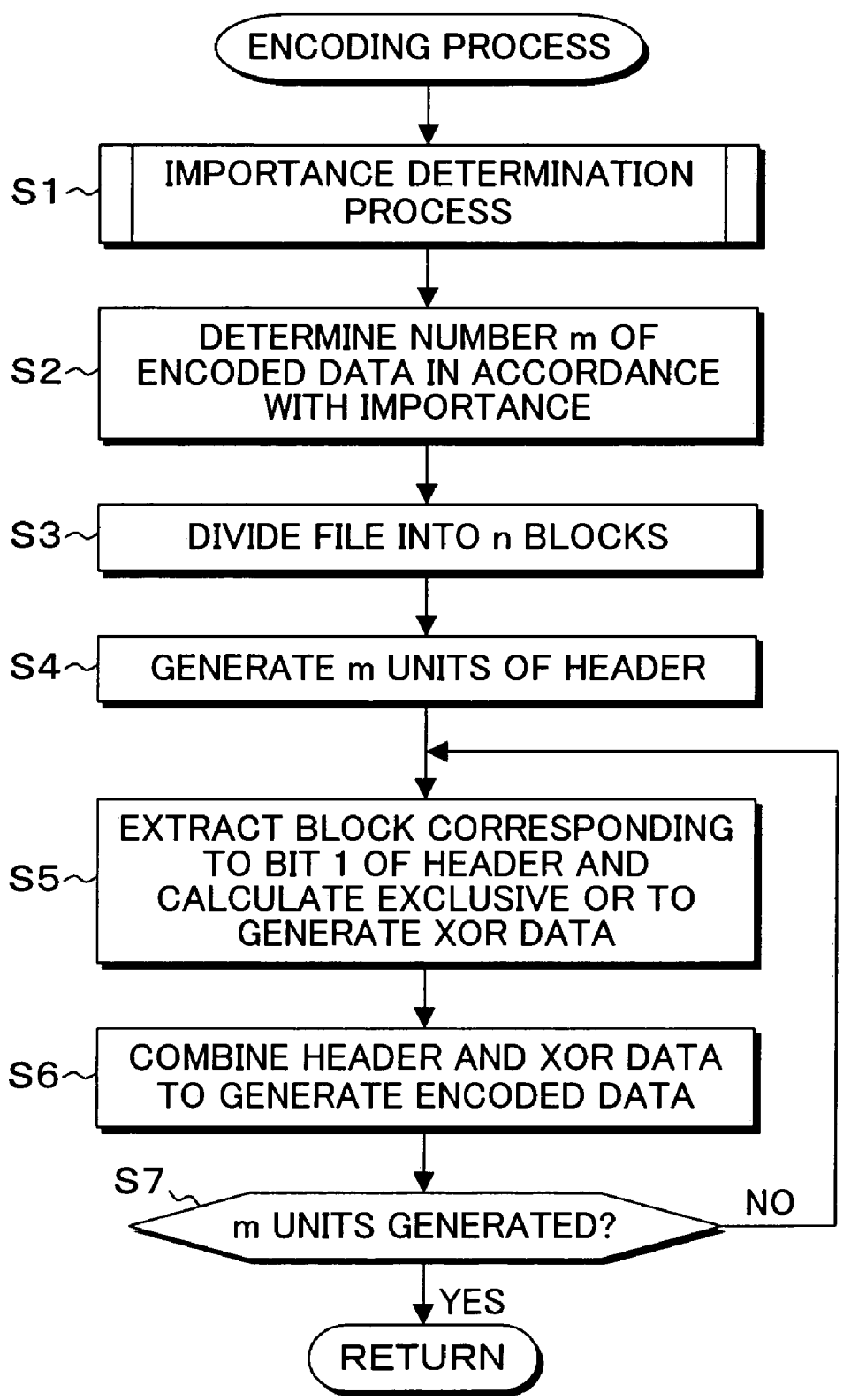
FIG. 14 is a flow chart of the encoding process in step S3 of FIG. 13.

FIG. 14 is a flow chart of the encoding process in step S3 of FIG. 13. In FIG. 14, in the encoding process, after a process of determining the importance of the file which is serving as the original data is performed in step S1, the encoded data number m is determined from the determined importance in accordance with the above described expression (1) in step S2. Subsequently, in step S3, the file which is the original data to be processed is divided into n blocks, for example, into n=1028 blocks; and then, headers corresponding to the encoded data number m are generated in step S4; and the block corresponding to bit 1 of the header is extracted and exclusive OR is calculated, thereby generating XOR data in step S5. Then, in step S6, the header and the XOR data are combined to generate the encoded data. Subsequently, whether m-units of encoded data have been generated or not is checked in step S7; if they have not been generated, the process returns to step S5 wherein the encoded data is similarly generated for the next header; and, if the m-units are generated, the encoding process is terminated, and the process returns to the main routine of FIG. 13.

Figure 15A:
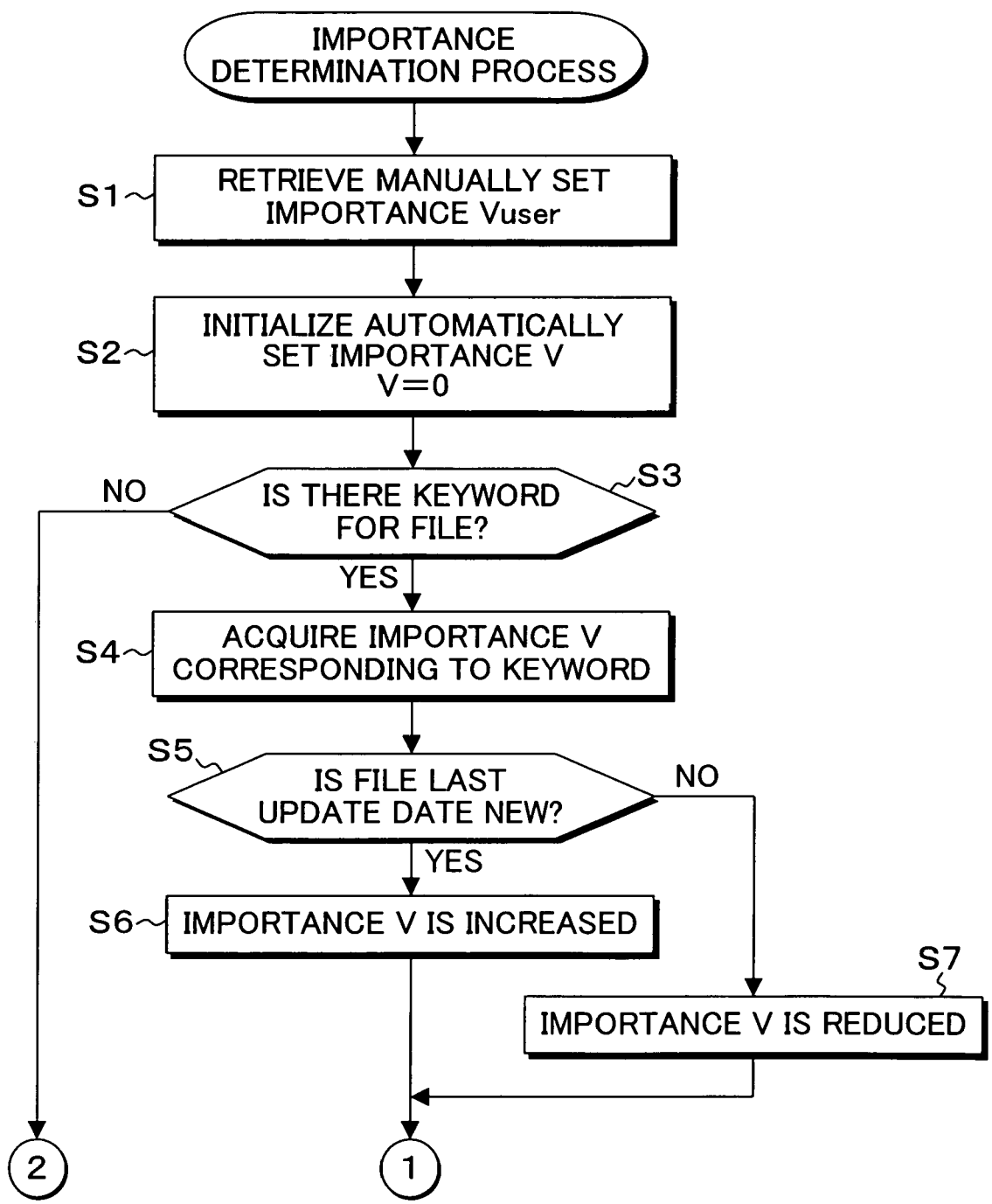
FIGS. 15A and 15B are flow charts of the importance determination process in step S1 of FIG. 14.
Figure 15B:
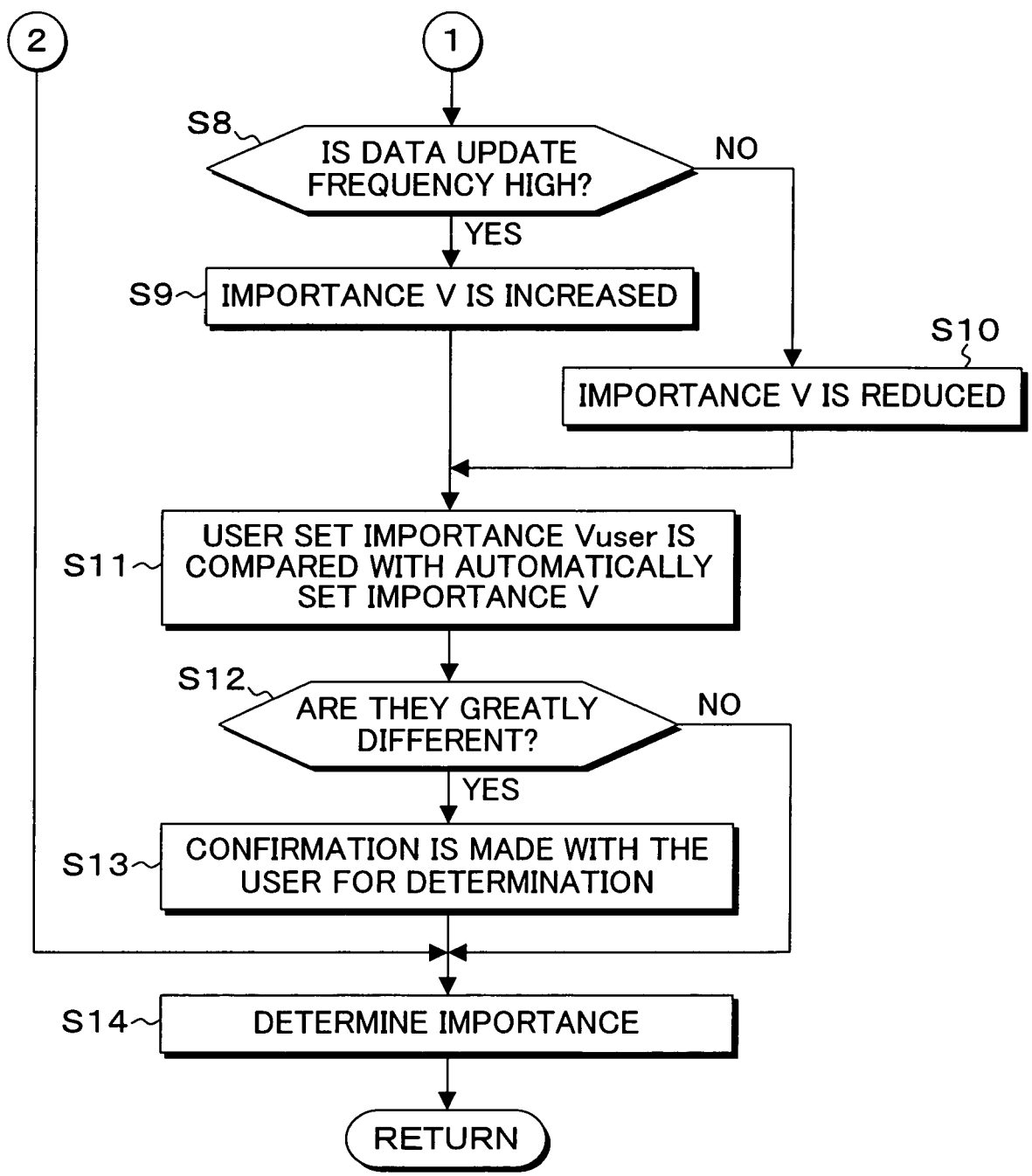

FIGS. 15A and 15B are flow charts of the process of step S1 of FIG. 14 of determining the importance used in the encoding process. In FIGS. 15A and 15B, in the importance determination process, importance Vuser set by the user is retrieved from the client 14 in step S1, and automatically set importance V is initialized such that V=0 in step S2. Subsequently, whether there is a keyword in the file which is to be processed is checked in step S3; and, if there is the keyword, in step S4, the importance control table 30-1 such as that shown in FIG. 8A is referenced, and the importance V corresponding to the keyword is retrieved. Subsequently, whether the file last update date is new or not is checked in step S5; and, if it is new, the process proceeds to step S6, wherein the importance V retrieved in step S4 is increased by a predetermined amount or by a predetermined rate. Meanwhile, if the file update date is old, the process proceeds to step S7, wherein the importance V is reduced by a predetermined amount or a predetermined rate. Subsequently, in step S8, whether the update frequency of the data is high or not is checked. If the update frequency is high, the importance V is corrected to be increased in step S9. If the update frequency is low, the importance is corrected to be reduced in step S10. Subsequently, in step S11, the importance Vuser set by the user is compared with the importance V automatically determined by the processes of steps S3 to S10. If they are determined that they are largely different from each other in step S12; the automatically set importance is displayed in the screen of the client 14, and confirmation is made with the user in step S13; and the importance is determined in step S14. If the difference between them is not large, the importance is determined in step S14 without change.

Figure 16:
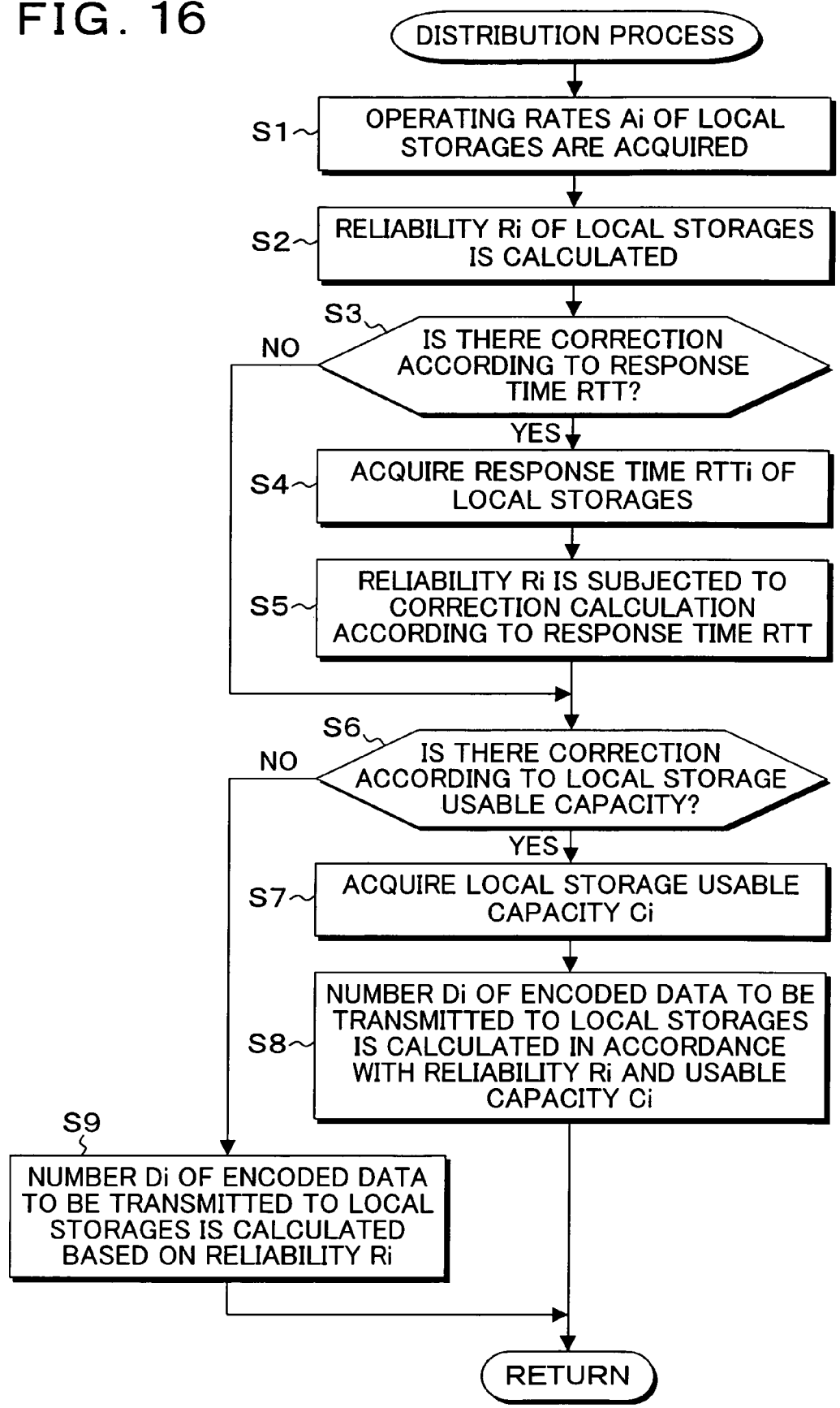
FIG. 16 is a flow chart of the distribution process in step S4 of FIG. 13.

FIG. 16 is a flow chart of the distribution process of the encoded data of step S4 of FIG. 13. In FIG. 16, in the distribution process of the encoded data, the operating rate Ai of the local storage is obtained by the calculation of the above described expression (2) in step S1, and the reliability Ri of the local storage is calculated from the above described expression (5) in step S3. Subsequently, presence of correction by the physical distance RTT from the main storage 12 to each local storage is checked in step S3; if there is the correction, the process proceeds to step S4, wherein response time RTTi to the local storage is acquired; and the reliability Ri is subjected to a correction calculation by the above described expression (8) in step S5. Subsequently, whether correction by use of the usable capacity of the local storage is to be made or not is checked in step S6; if the correction is to be made, the usable capacity Ci of the local storage is acquired in step S7; and the number Di of the encoded data to be transmitted to the local storage is calculated by the above described expression (9) from the reliability Ri and the usable capacity Ci in step S8. Meanwhile, if the correction by use of the local storage usable capacity is not found in step S6, the process proceeds to step S9, wherein the number Di of distribution of the encoded data is calculated from the reliability Ri by the above described expression (6). In the calculation of the distribution number of the encoded data in steps S8 and S9, instead of the encoded data number m in the expression (6), it may be calculated from the expression (1) using the importance Vi of the file which is the original data like the expression (7). Moreover, the present invention provides a backup program executed by the computer of the main storage server 10 of FIG. 4, and this program has the contents shown in the flow charts of FIG. 13, FIG. 14, FIG. 15A, FIG. 15B, and FIG. 16. Moreover, the present invention provides a computer-readable recording medium storing the backup program; and this recording medium includes a portable storage medium such as a CD-ROM, a floppy disk (R), a DVD disk, an optical disk, or an IC card; a recording device such as a hard disk provided in/outside a computer system. In the present embodiment, as shown in the expression (1), the block division number n is fixed, and the number m of the encoded data is determined in accordance with the importance Vi of the original data, that is, the redundancy Q(=m/n) is changed; however, the block division number n can be determined as n=G(Vi) in accordance with the importance of the original data. In this relation, the higher the importance of the original data, the more the block division number is increased. In this case, when the redundancy Q is set as a fixed value in the range of, for example, 1.1 to 1.5, and the block division number n is determined in accordance with the importance Vi, the encoded data number m is uniquely determined by the fixedly-set redundancy Q. Moreover, the present invention includes arbitrary modifications that do not impair the object and advantages thereof, and is not limited by the numerical values shown in the above described embodiment.

What is claimed is:

1. A backup system, comprising:
   a main storage device for storing original data;
   a plurality of local storage devices for storing the distributed data of the main storage device;
   an encoding unit for, after dividing the original data, generating a plurality of encoded data equal to or more than a division number by use of a code of which redundancy is variable;
   a redundancy control unit for varying the redundancy in the encoding unit;
   a distribution processing unit for distributing the plurality of encoded data to the plurality of local storage devices and causing the encoded data to be stored in the local storage devices; and
   a restoring unit for retrieving the encoded data corresponding to at least the division number of the original data from the local storage devices and restoring the original data;

wherein the encoding unit includes:
a block dividing unit for dividing the original data into n-units of block data, and
an encoded data generating unit for generating, merely in a number m according to redundancy Q, headers, in each of which a bitmap specifying one or a plurality of blocks for obtaining exclusive OR in the n-units of block data is disposed, and encoded data comprised of exclusive OR data of the one or plurality of block data specified by the header;
wherein the restoring unit retrieves the block number n or more of the encoded data from the plurality of local storage devices, and converts the header into a unit matrix by means of the Gaussian elimination method so as to restore the n-units of block data.

2. The system according to claim 1, wherein the redundancy control unit varies the redundancy in the encoding unit in accordance with importance of the original data.

3. The system according to claim 2, wherein in the redundancy control unit, the importance of the original data is manually set or automatically set in accordance with a keyword contained in the original data, update date and time, or update frequency.

4. The system according to claim 3, wherein as the automatic setting of the importance, the redundancy control unit sets importance corresponding to the keyword contained in the original data, and then, corrects the importance in accordance with the update date and time and/or the update frequency.

5. The system according to claim 1, wherein the distribution processing unit determines the distribution number of the plurality of encoded data in accordance with reliability or usable capacity of the plurality of local storage devices.

6. The system according to claim 5, wherein in the distribution processing unit, the reliability of the local storage device is manually set or automatically set based on an operating rate or response time (RTT).

7. The system according to claim 5, wherein the distribution processing unit sets the importance of the local storage device in accordance with the operating rate, and then, corrects the importance in accordance with the response time (RTT) of the local storage.

8. The system according to claim 1, wherein when the local storage device is newly added or eliminated, based on the local storage devices after the change, the encoded data is regenerated in the encoding unit, and then, the encoded data is redistributed by the distribution processing unit.

9. The system according to claim 1, wherein the main storage device stores the original data in synchronization with data of a storage device of a client, and the plurality of local storage devices is connected to the main storage device through a network.

10. A backup method of a system having a main storage device for storing original data and a plurality of local storage devices for storing the distributed data of the storage device, the backup method comprising:
after dividing the original data, generating a plurality of encoded data equal to or more than a division number by use of a code of which redundancy is variable;
varying the redundancy;
distributing the plurality of encoded data to the plurality of local storage devices and causing the encoded data to be stored in the local storage devices; and
retrieving the encoded data corresponding to at least the division number of the original data from the local storage devices and restoring the original data;
wherein the generating includes:
dividing the original data into n-units of block data, and
generating, merely in a number m according to redundancy Q, headers, in each of which a bitmap specifying one or a plurality of blocks for obtaining exclusive OR in the n-units of block data is disposed, and encoded data comprised of exclusive OR data of the one or plurality of block data specified by the headers;
wherein, the block number n or more of the encoded data is retrieved from the plurality of local storage devices, and the header is converted into a unit matrix by means of the Gaussian elimination method so as to restore the n-units of block data.

11. The method according to claim 10, wherein the redundancy is varied in accordance with importance of the original data.

12. The method according to claim 11, wherein the importance of the original data is manually set or automatically set based on a keyword contained in the original data, update date and time, or update frequency.

13. The method according to claim 10, wherein the distribution number of the plurality of encoded data is determined in accordance with reliability or usable capacity of the plurality of local storage devices.

14. The method according to claim 10, wherein when the local storage device is newly added or eliminated, based on the local storage devices after the change, the encoded data is regenerated, and then, the encoded data is redistributed.

15. A computer-readable storage medium which stores a backup program causing a computer of a main storage device for distributing and storing original data to and in a plurality of local storage devices to execute a process, comprising:
after dividing the original data, generating a plurality of encoded data equal to or more than a division number by use of a code of which redundancy is variable;
varying the redundancy;
distributing the plurality of encoded data to the plurality of local storage devices and causing the encoded data to be stored in the local storage devices; and
retrieving the encoded data corresponding to at least the division number of the original data from the local storage devices and restoring the original data;
wherein the generating includes:
dividing the original data into n-units of block data, and
generating, merely in a number m according to redundancy Q, headers, in each of which a bitmap specifying one or a plurality of blocks for obtaining exclusive OR in the n-units of block data is disposed, and encoded data comprised of exclusive OR data of the one or plurality of block data specified by the header;
wherein, the block number n or more of the encoded data is retrieved from the plurality of local storage devices, and the header is converted into a unit matrix by means of the Gaussian elimination method so as to restore the n-units of block data.

16. The storage medium according to claim 15, wherein the importance of the original data is manually set or automatically set based on a keyword contained in the original data, update date and time, or update frequency.

17. The storage medium according to claim 15, wherein the distribution number of the plurality of encoded data is determined in accordance with reliability or usable capacity of the plurality of local storage devices.

* * * * *

UNITED STATES PATENT AND TRADEMARK OFFICE
CERTIFICATE OF CORRECTION

PATENT NO. : 7,739,465 B2 Page 1 of 1
APPLICATION NO. : 11/407109
DATED : June 15, 2010
INVENTOR(S) : Hiroaki Kameyama et al.

It is certified that error appears in the above-identified patent and that said Letters Patent is hereby corrected as shown below:

Title page, item [73] (Assignee), Line 1 After "Kawasaki" insert -- (JP) --.

Signed and Sealed this

Sixteenth Day of November, 2010

David J. Kappos
*Director of the United States Patent and Trademark Office*